United States Patent
Wilcox et al.

(10) Patent No.: US 9,828,095 B1
(45) Date of Patent: Nov. 28, 2017

(54) MOTOR DEFLECTION MONITORING FOR UNMANNED AERIAL VEHICLES

(71) Applicant: Amazon Technologies, Inc., Seattle, WA (US)

(72) Inventors: Scott Michael Wilcox, Bothell, WA (US); Kevin Kwok Leung Yuen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 14/967,094

(22) Filed: Dec. 11, 2015

(51) Int. Cl.
| | |
|---|---|
| *B64C 39/02* | (2006.01) |
| *G05D 1/08* | (2006.01) |
| *G05D 1/04* | (2006.01) |
| *G05D 13/62* | (2006.01) |

(52) U.S. Cl.
CPC ........... *B64C 39/024* (2013.01); *G05D 1/042* (2013.01); *G05D 1/0808* (2013.01); *G05D 13/62* (2013.01); *B64C 2201/024* (2013.01); *B64C 2201/042* (2013.01); *B64C 2201/141* (2013.01)

(58) Field of Classification Search
CPC .. G05D 1/04; G05D 1/0808; B64C 2201/024; B64C 2201/042
See application file for complete search history.

(56) References Cited

U.S. PATENT DOCUMENTS

| | | | | |
|---|---|---|---|---|
| 4,192,189 | A | * | 3/1980 | Presley .................... G01P 15/11 73/504.03 |
| 2010/0224720 | A1 | * | 9/2010 | Roesch .................... B64C 27/26 244/12.3 |
| 2016/0039529 | A1 | * | 2/2016 | Buchmueller ......... B64D 31/06 244/65 |

* cited by examiner

*Primary Examiner* — Redhwan K Mawari
*Assistant Examiner* — Anshul Sood
(74) *Attorney, Agent, or Firm* — Athorus, PLLC (57) ABSTRACT

Deflection of a rotor of a motor, such as a brushless motor, of an unmanned aerial vehicle ("UAV") during operation may cause the magnets coupled to the interior surface of the rotor to move or walk down the surface, imbalancing the motor and potentially creating an unsafe flying condition for the UAV. The described methods and apparatus monitor rotor deflection of the motor during operation and alter one or more flight characteristics of the UAV if the deflection exceeds a tolerance range. By altering flight characteristics, external forces acting on the motor may be reduced, thereby reducing the deflection of the rotor.

20 Claims, 6 Drawing Sheets

MOTOR DEFLECTION MONITORING FOR UNMANNED AERIAL VEHICLES

BACKGROUND

Unmanned aerial vehicles are continuing to increase in use. For example, unmanned aerial vehicles are often used for surveillance. While there are many beneficial uses of unmanned aerial vehicles, they also have many drawbacks. For example, many unmanned aerial vehicles utilize multiple motors and propellers to maintain flight and navigate. For example, some unmanned aerial vehicles may include four motors and propellers, referred to as quad-copters, eight motors and propellers, referred to as octo-copters, etc. Utilizing multiple motors increases the potential for a mechanical failure that could endanger the operability of the unmanned aerial vehicle.

BRIEF DESCRIPTION OF THE DRAWINGS

The detailed description is described with reference to the accompanying figures. In the figures, the left-most digit(s) of a reference number identifies the figure in which the reference number appears.

While implementations are described herein by way of example, those skilled in the art will recognize that the implementations are not limited to the examples or drawings described. It should be understood that the drawings and detailed description thereof are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes methods and apparatus for monitoring deflection of a rotor of a brushless direct current (DC) motor during use on an unmanned aerial vehicle (UAV). If a motor and the propeller blade coupled to and rotated by the motor are properly balanced, the rotor of the motor will rotate around the stator with minimal deflection with respect to the base of the motor. However, if the UAV is operating in a manner or in conditions in which there are large external forces acting on the exterior surface of the rotor and/or the propeller, the rotor may be deflected with respect to the base of the motor under the load of those external forces. External forces may result from environmental conditions, such as high winds, rain, snow, hail, etc., and/or from operational conditions, the UAV accelerating, operating at a high speed, or velocity.

Deflection of the rotor of the motor may, in some instances, damage the motor. For example, if the rotor is deflected beyond a threshold, the rotational forces and imbalance of the rotation of the rotor may cause one or more of the magnets coupled to the interior of the rotor to move or "walk" down the interior surface of the rotor. Movement of the magnets coupled to the interior surface of the rotor permanently imbalance the motor. If the magnets move beyond a lower edge of the rotor, the magnet may contact the base of the motor, seizing the motor, and rendering it inoperable.

As discussed herein, one or more deflection sensors may be used to measure, during operation of the motor, an amount of deflection of the rotor. For example, the deflection sensor may measure a distance between the sensor and the rotor and provide those distance measurements to a deflection controller. The deflection controller will determine if the measured distance is within a tolerance range and/or whether the measured distance exceeds one or more thresholds, such as an upper threshold or a lower threshold. If the measured distance changes such that it is outside a tolerance range and/or exceeds a threshold, the deflection controller may cause one or more flight characteristics of the UAV to be altered in an effort to reduce the external forces that are causing the deflection. For example, the deflection controller may send instructions that cause the UAV to alter a heading, orientation, velocity, acceleration rate, speed, rotational speed of the motor, a pitch, yaw, and/or roll of the UAV, a pitch of a blade of the propeller, and/or change altitude.

If, after altering one or more flight characteristics, the measured distance returns to being within a tolerance range and/or within the upper threshold and lower threshold, navigation of the UAV will continue. However, if, after altering one or more flight characteristics, the measured distance continues to exceed a tolerance range or one of the thresholds, additional flight characteristics may be altered, or a flight plan of the UAV may be aborted.

Actively monitoring deflection of the rotors of the motors during operation of the motors and/or during operation of the UAV reduces or eliminates the potential for motor damage resultant from external forces acting on the motor and/or the propeller coupled to the motors. Likewise, in some implementations, the deflection controller may determine whether a change in the measured distance is representative of an impact between the propeller coupled to the motor and an object foreign to the UAV. For example, if the propeller coupled to the motor impacts a foreign object during rotation, the impact will cause a large deflection of the rotor, represented as a spike in the measured distance when compared over time. If the deflection controller detects an impact between the propeller and a foreign object, it may send instructions that cause rotation of the motor, and thus the propeller, to immediately terminate. Rapidly stopping rotation of the propeller may reduce or eliminate any damage to the foreign object, damage to the propeller of the UAV, and/or damage to the UAV.

Figure 1:
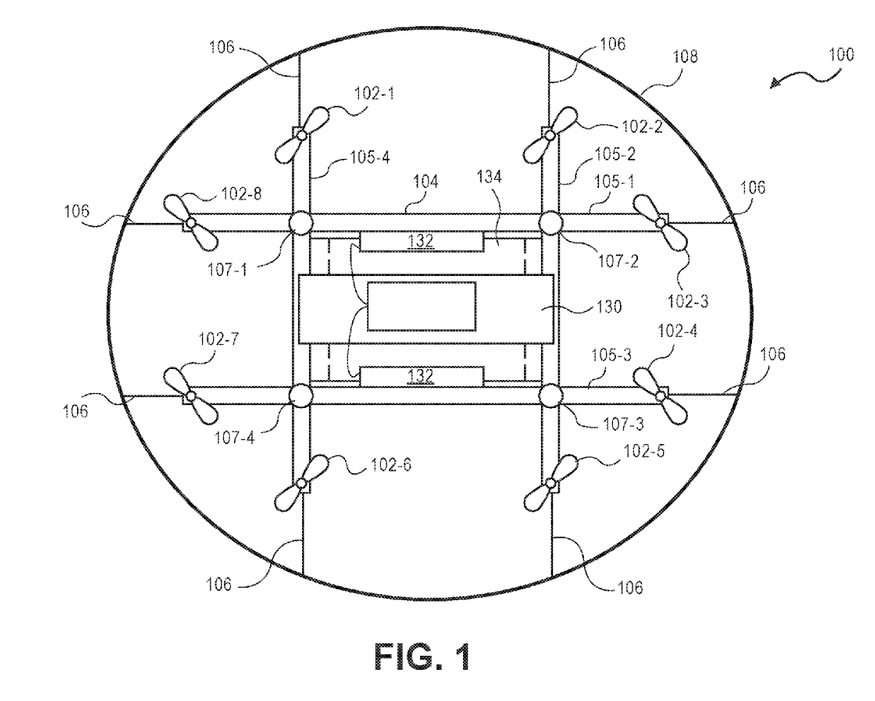
FIG. 1 depicts a block diagram of a top-down view of an unmanned aerial vehicle, according to an implementation.

FIG. 1 illustrates a block diagram of a top-down view of an UAV 100, according to an implementation. As illustrated in FIG. 1, the UAV 100 includes eight propellers 102-1, 102-2, 102-3, 102-4, 102-5, 102-6, 102-7, 102-8 powered by motors and spaced about a body 104 of the UAV as part of a propulsion system. Details of the motors are provided below with respect to FIGS. 2-3. Also, as will be described in more detail below with respect to FIGS. 2 and 4, a deflection sensor and deflection controller may be positioned at or incorporated into each motor that actively measures the deflection of the rotor of the motor as it rotates about a stator of the motor.

The motors and propellers 102 may be of any type and of a size sufficient to lift the UAV 100 and any items engaged by the UAV 100 so that the UAV 100 can navigate through the air, for example, to deliver an item to a location. In one implementation, for the purpose of item transport, the motors may each be a FX-4006-13 740 kv multi rotor motor, and the propellers may be made of one or more suitable materials such as graphite, carbon fiber, etc. The propellers may be fixed or variable pitch propellers. Likewise, in some implementations, the motors and/or motor arms may be configured such that an angle or orientation of the motor with respect to the UAV may be altered. While the example of FIG. 1 includes eight motors and propellers, in other implementations, more or fewer motors and/or propellers may be utilized for the propulsion system of the UAV 100. Likewise, in some implementations, the motors and/or propellers may be positioned at different locations on the UAV 100. In addition, alternative methods of propulsion may be utilized. For example, engines, fans, jets, turbojets, turbo fans, jet engines, and the like may be used to propel the UAV.

The body 104 or frame of the UAV 100 may be of any suitable material, such as graphite, carbon fiber, and/or aluminum. In this example, the body 104 of the UAV 100 includes four rigid members 105-1, 105-2, 105-3, 105-4, or beams arranged in a hash pattern with the rigid members intersecting and joined at approximately perpendicular angles at intersection points 107-1, 107-2, 107-3 and 107-4. The propellers 102 and corresponding motors are positioned at both ends of each rigid member 105. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some embodiments, all of the rigid members 105 may be of approximately the same length while, in other implementations, some or all of the rigid members may be of different lengths. Likewise, the spacing between the two sets of rigid members may be approximately the same or different.

While the implementation illustrated in FIG. 1 includes four rigid members 105 that are joined to form at least part of the body 104, in other implementations, there may be fewer or more components to the body 104. For example, rather than four rigid members, in other implementations, the body 104 of the UAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the body 104. As discussed further below, a cavity within the body 104 may be configured to include an engagement mechanism 134 for the engagement and transport of item(s) and/or containers that contain item (s) (e.g., for the delivery of an ordered item to a user).

In some implementations, the UAV may be configured for aerodynamics. For example, an aerodynamic housing may be included on the UAV that encloses the UAV control system 130, one or more of the rigid members 105, the body 104, and/or other components of the UAV 100. The housing may be made of any suitable material(s) such as graphite, carbon fiber, aluminum, etc. Likewise, in some implementations, the engagement mechanism 134 may be configured such that, when an item is engaged, it is enclosed within the frame and/or housing of the UAV 100 so that no additional drag is created during transport of the item by the UAV 100.

Extending outward from each rigid member is a support arm 106 that is connected to a safety barrier 108. In this example, the safety barrier is positioned around and attached to the UAV 100 in such a manner that the motors and propellers 102 are within the perimeter of the safety barrier 108. The safety barrier may be plastic, rubber, etc. Likewise, depending on the length of the support arms 106 and/or the length, number or positioning of the rigid members 105, the safety barrier may be round, oval, or any other shape.

Mounted to the body 104 is the UAV control system 130. In this example, the UAV control system 130 is mounted in the middle and on top of the body 104. The UAV control system 130, as discussed in further detail below with respect to FIG. 6, controls the navigation, communication and other operations of the UAV 100. In various implementations, the UAV 100 may also include one or more power modules 132. In this example, the UAV 100 includes two power modules 132 that are removably mounted to the body 104. In various implementations, the power module(s) for the UAV may be in the form of battery power, solar power, gas power, super capacitor, fuel cell, alternative power generation source, or a combination thereof. For example, the power modules 132 may each be a 6000 mAh lithium-ion polymer battery, polymer lithium ion (Li-poly, Li-Pol, LiPo, LIP, PLI or Lip) battery. The power modules 132 are coupled to and provide power for the UAV control system 130 and the motors.

As noted above, the UAV may also include an engagement mechanism 134. The engagement mechanism 134 may be configured to engage and disengage items and/or containers that hold items. In this example, the engagement mechanism 134 is positioned within a cavity of the body 104 that is formed by the intersections of the rigid members 105. The engagement mechanism 134 may be positioned beneath the UAV control system 130. In implementations with additional rigid members, the UAV may include additional engagement mechanisms and/or the engagement mechanism 134 may be positioned in a different cavity within the body 104. The engagement mechanism 134 may be of any size sufficient to securely engage and disengage items and/or containers that contain items. The engagement mechanism 134 communicates with (e.g., via wired or wireless communication) and is controlled by the UAV control system 130.

While the implementations of the UAV discussed herein utilize propellers to achieve and maintain flight, in other implementations, the UAV may be configured in other manners. For example, the UAV may include fixed wings and/or a combination of both propellers and fixed wings. In such configurations, the UAV may utilize one or more propellers to enable takeoff and landing and a fixed wing configuration or a combination wing and propeller configuration to sustain flight while the UAV is airborne.

Figure 2:
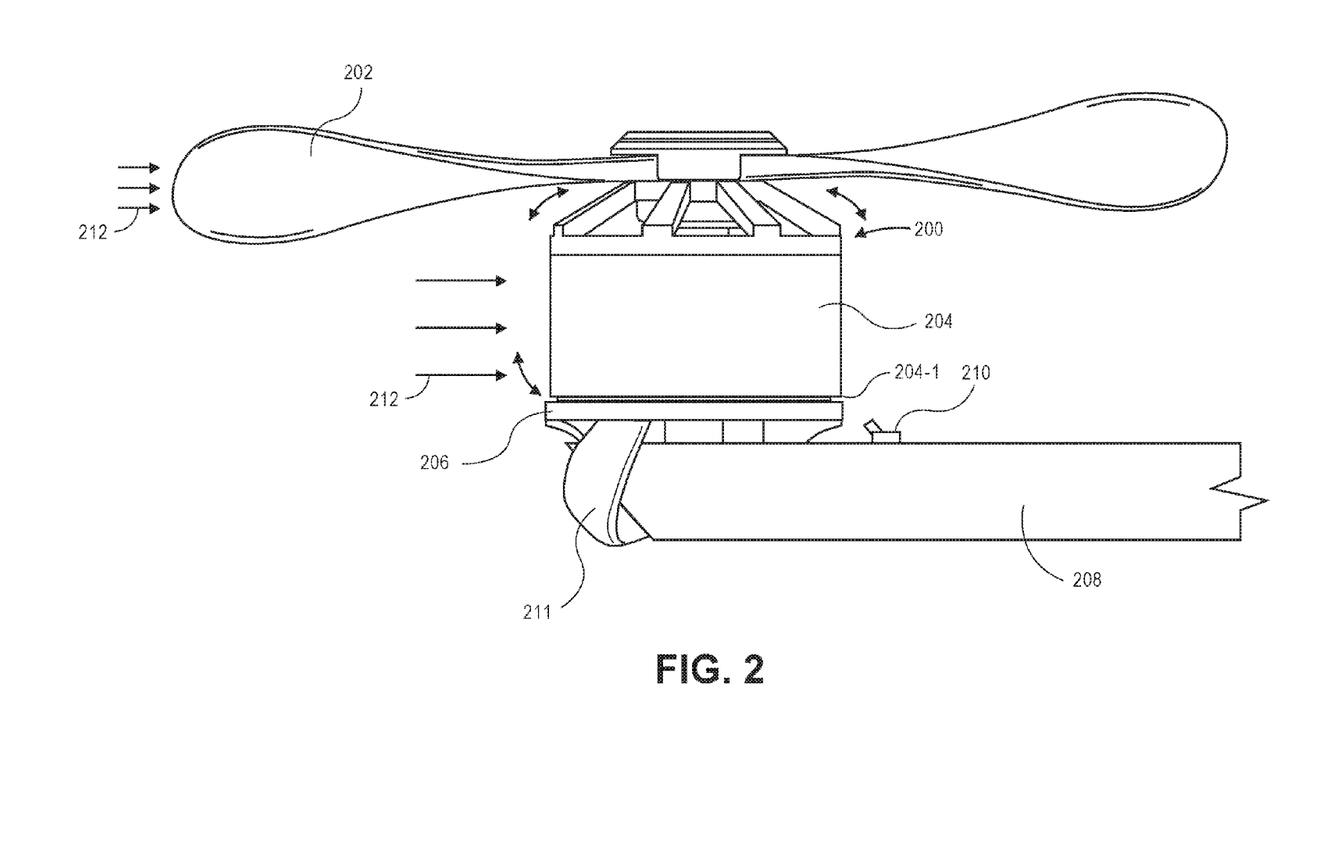
FIG. 2 depicts a motor mounted to a motor arm with a deflection sensor, according to an implementation.

FIG. 2 depicts a diagram of a motor 200 coupled to a motor arm 208 that includes a deflection sensor 210, according to an implementation. In this example, the motor may be any type of motor 200, such as a brushless DC motor, in which a rotor 204 rotates about a stator (not shown in FIG. 2) to drive rotation of a propeller 202. The motor 200 includes a base 206 that is affixed to a motor arm 208 that secures the motor 200 to the motor arm 208 of the UAV. The base 206 of the motor 200 may be affixed to the motor arm 208 by a series or type of screws, clamps, mounts, fasteners, etc.

The propeller 202 is affixed to the rotor 204 of the motor 200 such that the propeller 202 rotates with a rotation of the rotor 204. For example, in some configurations, a propeller shaft may extend from the top of the rotor and the propeller may be affixed to the shaft. In other configurations, the propeller 202 may be directly coupled or clamped to the rotor 204.

The wires 211 that extend from the motor 200, in some implementations, may be routed through a hollow portion or cavity within the motor arm 208. The wires 211 may be used to provide power and/or instructions to the motor to cause rotation of the motor. For example, the wires 211 may couple the motor 200 to an electronic speed control (ESC) that is part of the UAV control system. The ESC may provide instructions that cause the motor to rotate at a speed that will generate a commanded lift from forces generated by the rotation of the propeller 202. In some implementations, as discussed further below, if the deflection controller detects an impact between the propeller and an object foreign to the UAV, instructions may be sent to the motor 200, via the wires 211, to terminate rotation of the motor, which in turn stops rotation of the propeller 202.

In this implementation, one or more deflection sensors are positioned on the motor arm 208 about the motor 200 and oriented to measure a distance between the rotor 204 of the motor 200 and the deflection sensor 210. In some implementations, there may be a single deflection sensor 210 oriented to measure a deflection of the rotor 204. In other implementations, there may be multiple deflection sensors at different positions that are oriented to measure deflection of the rotor 204 of the motor 200. For example, a first deflection sensor 210 may be at a first position with respect to the motor 200 and configured to measure a first deflection of the rotor 204 of the motor 200. A second deflection sensor may be at a second position with respect to the motor, the second position being different than the first position, and oriented to measure a second deflection of the rotor 204 of the motor 200. For example, if the motor is viewed as a 360 degree circle, a first deflection sensor may be positioned at zero degrees and a second sensor may be positioned at ninety degrees. Utilizing multiple deflection sensors at different positions with respect to the motor 200 enables measurement and monitoring of deflection caused by external forces acting on the rotor and/or propeller from any direction. Each of the deflection sensors for a single motor may provide distance measurements to the same or different deflection controller.

The deflection sensor measures the distance between the deflection sensor and the rotor during operation of the UAV and/or during operation of the motor 200. The deflection sensor may be coupled to and powered by the motor 200 (e.g., via power received via wires 211) and/or may be coupled to and receive power from the UAV control system and/or the power modules (discussed above) of the UAV. The deflection sensor 210 may be any type of distance measurement device including, but not limited to, a capacitive sensor, an inductive sensor, an ultrasonic sensor, a contact sensor, a camera, a Hall effect sensor, etc. In some implementations, the deflection sensor may be capable of detecting sub-millimeter changes in the distance between the deflection sensor 210 and the rotor 204 of the motor. In implementations that utilize a camera, images may be obtained and compared to determine a difference in a distance between objects represented in the images. Alternatively, the camera may include a depth component, such as a stereo camera, that is used to determine a distance between the camera and the rotor.

Likewise, while the deflection sensor 210 may be positioned to detect any change in distance between the deflection sensor 210 and the rotor, in some implementations, the deflection sensor 210 may be oriented to measure a distance between the deflection sensor and a lower edge 204-1 of the rotor 204. Because the rotor 204 is a cylindrical object, measuring distance at the lower edge 204-1 will represent an area of largest change in distance due to deflection of the rotor. For example, if an external force 212, such as wind, is acting on the rotor 204 and/or propeller 202 such that the rotor 204 deflects, the largest distance change between the rotor 204 and the deflection sensor 210 will occur at the lower edge 204-1 of the rotor.

The deflection sensor 210 may provide distance measurements obtained during operation of the motor 200 to a deflection controller that determines if the distance measurement is within a tolerance range and/or whether the distance measurement exceeds one or more thresholds. For example, the distance between the deflection sensor 210 and the rotor 204 may be calibrated or determined when the motor is mounted to the motor arm 208 that includes the deflection sensor 210 and any change in measurement that exceeds 0.5 millimeters (mm) may be determined to exceed a tolerance range or threshold. In other implementations, the distance between the deflection sensor 210 and the rotor 204 may be determined or calibrated each time the motor or the UAV is initially powered and/or as part of a pre-flight safety check and any change from that initial measurement beyond a defined amount (e.g., ±0.5 mm) may be determined to exceed a threshold or tolerance range. In other implementations, the tolerance range or threshold may be greater or less than 0.5 mm.

In some implementations, rather than the deflection sensor 210 sending measurements to a deflection controller, the deflection sensor 210 may be configured to measure distances between the deflection sensor 210 and the rotor 204 and determine if the measured distance exceeds a tolerance range and/or a threshold. For example, similar to operation of the deflection controller, the deflection sensor may determine or maintain an initial distance between the deflection sensor 210 and the rotor 204 and any distance measurement beyond a tolerance or defined threshold may be determined by the deflection sensor 210. If it is determined that a measured distance exceeds a tolerance range or threshold, the deflection sensor 210 may transmit an alert, flag, or other notification that is sent to the UAV control system.

The deflection sensor 210 and/or a deflection controller that receives distance measurements from the deflection sensor 210 may also be configured to determine if the propeller 202 has impacted an object foreign to the UAV. For example, deflection resulting from external forces acting upon the rotor 204 or propeller 202 other than an impact are generally represented as a gradual change in deflection, with the deflection of the rotor gradually increasing over a period of time as the external forces increase. However, an impact between a rotating propeller and a physical object that is foreign to the UAV will represent a large and abrupt change (i.e., spike) in the deflection of the rotor. Such an immediate change in the deflection of the rotor may be detected by the deflection sensor and/or the deflection controller and, upon detection, instructions may be sent to the motor 200 that cause the motor to terminate rotation. The instructions may be in the form of removing power from the motor, a termination command for the rotational speed of the motor, etc. In some implementations, the instructions may include an instruction to rotate the motor in an opposite direction for a defined distance (e.g., five degrees). Such an instruction will not only immediately stop rotation of the propeller in its current direction but will also move the propeller away from the impacted foreign object.

By monitoring rotor deflection for abrupt changes representative of impacts between the propeller and an object foreign to the UAV and ceasing rotation of the propeller upon detection may reduce or eliminate potential damage to the foreign object, the propeller 202, the motor 200 and/or the UAV.

As discussed further below with respect to FIG. 5, if the measured distance between the deflection sensor 210 and the rotor 204 of the motor 200 exceeds a tolerance range or threshold, but the deflection is not representative of an impact, instructions may be sent that cause one or more actions to be performed. The actions may include altering a flight characteristic of the UAV in an effort to reduce the external forces acting on the rotor 204 and/or the propeller 202. The flight characteristics may include, but are not limited to, a heading of the UAV, an orientation of the UAV, a velocity of the UAV, an acceleration of the UAV, a speed of the UAV, a rotational speed of the motor, a pitch of the UAV, a yaw of the UAV, a roll of the UAV, a pitch of a blade of the propeller, an angle of the motor with respect to the UAV, or an altitude of the UAV.

By altering one or more flight characteristics, the external forces 212 acting upon the rotor 204 or the motor 200 may be reduced. For example, if the external force 212 is wind, by altering the altitude of the UAV, the external force may be reduced because the wind speed at different altitudes varies. Likewise, if the speed, acceleration, and/or velocity of the UAV is reduced, the external forces acting upon the rotor 204 and/or the propeller 202 may be reduced.

Figure 3:
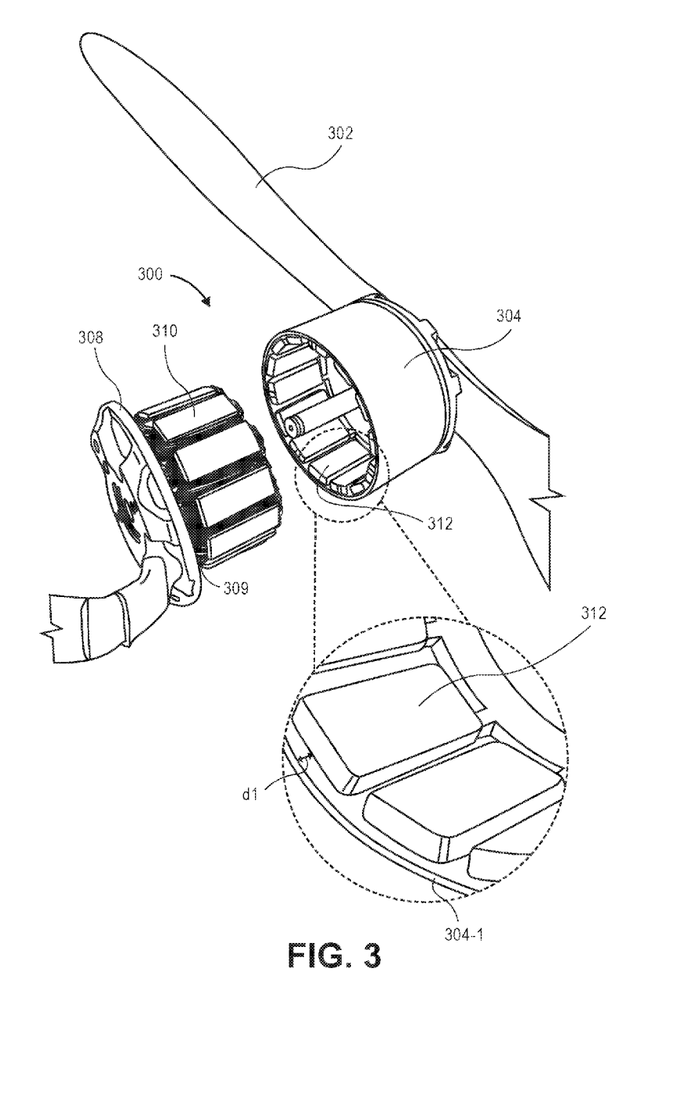
FIG. 3 depicts a detailed view of a motor and the magnets of the rotor of the motor, according to an implementation.

FIG. 3 depicts a detailed view of a motor 300 and the magnets 312 of the rotor 304 of the motor, according to an implementation. A brushless DC motor typically includes a base 308, a stator 309, and a rotor 304. The base 308 is generally used to affix the motor 300 to an aerial vehicle, such as a UAV. Likewise, the stator 309 is coupled to the base. The stator 309, also known as an armature, includes an electromagnetic assembly 310, and is typically configured in a cylindrical manner, as shown in FIG. 3, and remains stationary on the base.

The rotor 304 is also configured in a cylindrical manner such that it extends above the base 308 and substantially encompasses and rotates around the stator 309. On an interior surface of the rotor are a series of magnets 312 that are used to drive rotation of the rotor. Specifically, as is known in the art, when a current is applied to the electromagnets 310, it causes alternating polarities of the electromagnets which attract or repel the magnets 312 affixed to the interior surface of the rotor 304. The attraction/repulsion of the magnets 312 by the electromagnets 310 of the stator 309 cause the rotor 304 to rotate. A propeller 302 is also affixed to the rotor 304 and rotates with the rotor 304.

As illustrated in the expanded view of FIG. 3, the magnets 312 are affixed to the interior surface of the rotor 304. The magnets are typically offset a distance (d1) from a lower edge 304-1 of the rotor 304. The magnets are often affixed to the interior surface of the rotor 304 using epoxy, glue, or other type of adhesive. While adhesives provide good binding between the interior surface of the rotor 304 and the magnets 312, during operation of the motor 300, especially at high speeds, the heat generated by the operation of the motor may cause the adhesive to become pliable. In such instances, if deflection of the rotor occurs, lateral forces act on the magnets as the rotor rotates that may cause the magnets 312 to move from a first position to a second position on the interior surface of the rotor 304. For example, the deflection of the rotor may cause the magnets to move or "walk" down the interior surface of the rotor 304 such that the distance d1 decreases. If some of the magnets move and others do not, the motor becomes physically imbalanced and the deflection increases, causing additional magnet 312 movement. In extreme cases, one or more of the magnets 312 may move to such an extent that the magnet exceeds the lower edge 304-1 of the rotor 304 and contacts the base 308 of the motor. In such an example, the contact will cause the motor to seize and stop rotation, thereby damaging the motor and potentially creating unsafe flying conditions for the UAV.

Figure 4:
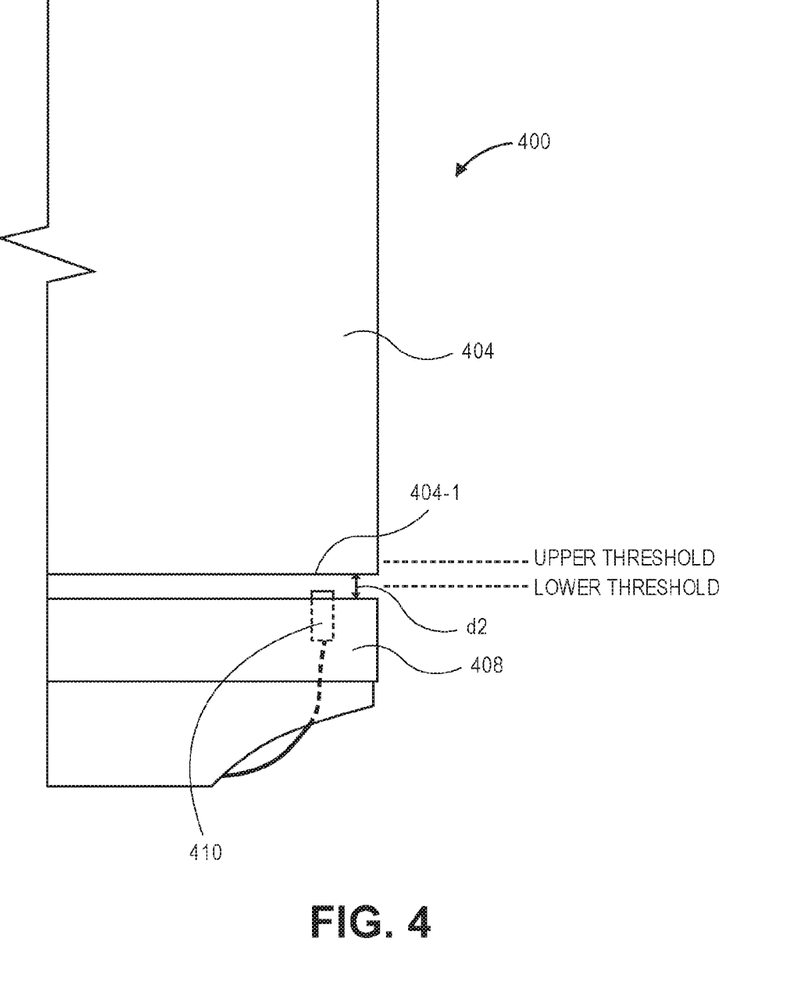
FIG. 4 depicts a close-up view of a rotor and a base of a motor with a deflection sensor, according to an implementation.

FIG. 4 depicts a close-up view of a rotor 404 and a base 408 of a motor 400 with a deflection sensor 410, according to an implementation. In this implementation, the deflection sensor 410 is incorporated into the base 408 of the motor 400. The deflection sensor 410 may be positioned such that it is flush with the upper surface of the base 408 and effectively measures the distance between the base 408 and the lower edge 404-1 of the rotor 404. Alternatively, as illustrated, the deflection sensor 410 may be slightly offset from the base.

The deflection sensor may be positioned within the base 408 so that it is aligned with the perimeter of the rotor 404 and can measure the distance (d2) between the lower edge 404-1 of the rotor 404 and the base 408. As discussed above, the deflection sensor may measure the distance d2 and determine if the distance is within a tolerance range and/or if it exceeds a threshold, such as the upper threshold or the lower threshold. In some implementations, depending on the type of deflection sensor, a plate or other component may be coupled to the rotor 404 so that the deflection sensor can measure the distance between the deflection sensor and the plate. In other implementations, the deflection sensor may be positioned toward the interior of the rotor 404 and aligned with the magnets that are coupled to the interior surface of the rotor 404. In such an implementation, the deflection sensor 410 may determine a distance between the deflection sensor and a lower edge of the magnets and monitor that distance to determine deflection of the rotor and/or movement of the magnets along the interior surface of the rotor 404.

While the example in FIG. 4 only illustrates a single deflection sensor 410, the motor 400 may include multiple sensors at different positions along the base 408 so that deflection of the rotor 404 at different angles can be detected. For example, the motor 400 may include two or more sensors positioned at different locations on the base 408. As discussed above, the deflection sensors 410 may obtain distance measurements and provide them to a deflection controller, which may be incorporated into and/or separate from the motor 400 and the deflection controller may determine if the distance d2 exceeds a tolerance range and/or a threshold. Alternatively, the deflection sensor(s) 410 may obtain distance measurements and determine whether the distance d2 exceeds a tolerance range and/or a threshold.

If the distance measurement is not within a tolerance range and/or exceeds a threshold, a notification or alert is sent that causes the UAV control system to alter a flight characteristic of the UAV, terminate rotation of the propeller of the motor 400, or abort a flight plan of the UAV.

Figure 5:
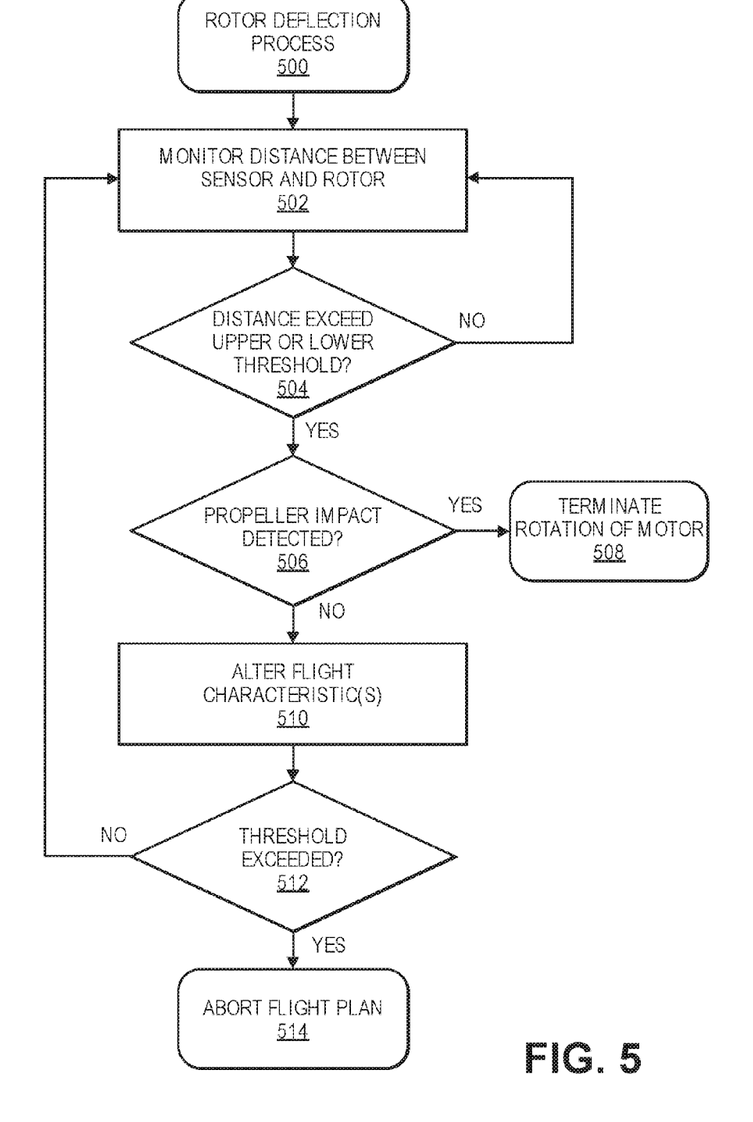
FIG. 5 is a flow diagram illustrating an example deflection monitoring process, according to an implementation.

FIG. 5 is a flow diagram illustrating an example deflection monitoring process 500, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins with a deflection sensor monitoring a distance between the deflection sensor and a rotor of a motor during operation of the motor, as in 502. As discussed above, the distance measurement may be monitored for any portion of the rotor. In some implementations, the distance measurement may be between the deflection sensor and a lower edge of the rotor.

A determination is made as to whether the distance measurement exceeds an upper threshold or a lower threshold, as in 504. The upper threshold and lower threshold may be representative of any number, percentage, and/or amount of change between an initial position and a deflected position of the rotor. For example, when the motor is powered up, an initial distance measurement may be obtained and the upper threshold and/or lower threshold may be specified as a percentage or amount of change from the default distance measurement. For example, if the initial distance measurement between the deflection sensor and the lower edge of the rotor is 0.6 mm., the upper threshold may be specified to be 0.8 mm., and the lower threshold may be specified to be 0.4 mm. As will be appreciated, any other amount, degree or range may be utilized.

If it is determined that the measured distance does not exceed the upper threshold and/or lower threshold, the example process 500 returns to block 502 and continues. The example process 500 may continue during operation of the motor and/or at any time the UAV is powered. If it is determined that the measured distance does exceed the upper or lower threshold, a determination is made as to whether a propeller impact is detected, as in 506. By obtaining measurements over time during operation of the motor, adjacent measurements may be compared to determine a degree or abruptness of a change in the distance measurements. Deflection that is caused by a propeller coupled to the motor contacting a physical object that is foreign to the UAV causes an abrupt and large change in the deflection of the motor, also known as a spike. In comparison, other external forces (e.g., wind) acting on the rotor and/or the propeller that cause deflection cause a more gradual change in the distance measurements over time.

If it is determined that an impact between the propeller of the motor and an object foreign to the UAV is detected, instructions are sent that cause the motor to terminate rotation, which stops rotation of the propeller, as in 508. By terminating rotation of the motor, and thus rotation of the propeller, damage to the object, the propeller, and/or the UAV may be reduced or eliminated.

If it is determined that an impact between the propeller and an object foreign to the UAV has not been detected, instructions are sent that cause one or more flight characteristics of the UAV to be altered, as in 510. By altering the flight characteristics of the UAV, the external forces acting on the rotor and/or the propeller that are causing the deflection may be reduced. Any one or more flight characteristics may be altered, including, but not limited to, a heading of the UAV, an orientation of the UAV, a velocity of the UAV, an acceleration of the UAV, a speed of the UAV, a rotational speed of the motor, a pitch of the UAV, a yaw of the UAV, a roll of the UAV, a pitch of a blade of the propeller, an angle of the motor with respect to the UAV, or an altitude of the UAV.

After altering the one or more flight characteristics, one or more additional distance measurements are obtained and a determination is made as to whether the distance measurement exceeds the threshold, as in 512. If it is determined that the distance measurement no longer exceeds the threshold, the example process 500 returns to block 502 and continues. If it is determined that the distance measurement still exceeds the threshold, either additional flight characteristics are altered in an effort to reduce the external forces acting on the rotor and/or propeller of the UAV that are causing the deflection, or the flight plan of the UAV is aborted, as in 514.

By altering flight characteristics to reduce deflection of the motor and/or aborting the flight plan of the UAV if the deflection cannot be reduced, the potential for damage to the motor and the potential for unsafe operation of the UAV are reduced.

Figure 6:
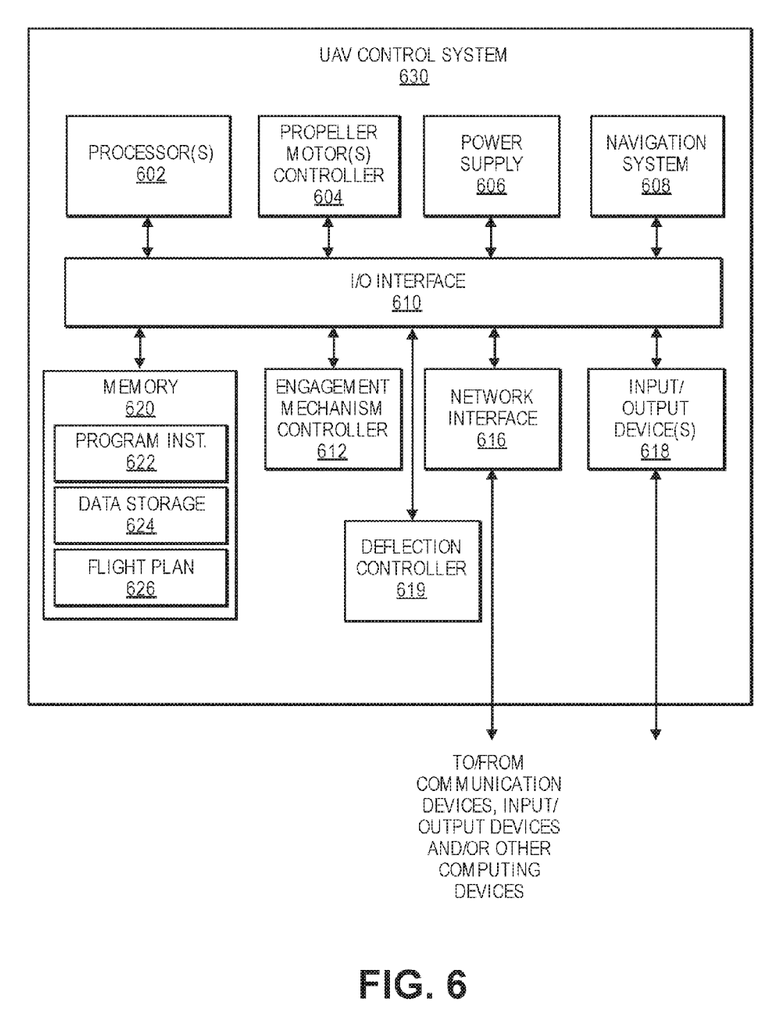
FIG. 6 is a block diagram illustrating various components of an unmanned aerial vehicle control system, according to an implementation.

FIG. 6 is a block diagram illustrating an example UAV control system 630 of a UAV 100. In various examples, the block diagram may be illustrative of one or more aspects of the UAV control system 630 that may be used to implement the various systems and methods discussed above. In the illustrated implementation, the UAV control system 630 includes one or more processors 602, coupled to a non-transitory computer readable storage medium 620 via an input/output (I/O) interface 610. The UAV control system 630 may also include a motor controller 604, also known as an electronic speed control (ESC), power supply module 606, and/or a navigation system 608. The UAV control system 630 may also include an engagement mechanism controller 612, a network interface 616, one or more input/output devices 618, and/or a deflection controller 619.

In various implementations, the UAV control system 630 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions and/or data items accessible by the processor(s) 602. In various implementations, the non-transitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 620 as program instructions 622, data storage 624, and flight plan data 626, respectively. In other implementations, program instructions, flight plan data, and/or other data may be received, sent, or stored upon different types of computer-accessible media, such as non-transitory media, or on similar media separate from the non-transitory computer readable storage medium 620 or the UAV control system 630. Generally speaking, a non-transitory, computer readable storage medium may include storage media or memory media such as magnetic or optical media, e.g., disk or CD/DVD-ROM, coupled to the UAV control system 630 via the I/O interface 610. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 616.

In one implementation, the I/O interface 610 may be configured to coordinate I/O traffic between the processor(s) 602, the non-transitory computer readable storage medium 620, and any peripheral devices, the network interface or other peripheral interfaces, such as input/output devices 618. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Also, in some implementations, some or all of the functionality of the I/O interface 610, such as an interface to the non-transitory computer readable storage medium 620, may be incorporated directly into the processor(s) 602.

The motor(s) controller 604 communicates with the navigation system 608 and adjusts the power of each motor to fly the UAV along a determined flight path. The navigation system 608 may include a GPS or other similar system than can be used to navigate the UAV to and/or from a location. The power supply module 606 may control the charging and any switching functions associated with one or more power modules (e.g., batteries) of the UAV.

The engagement mechanism controller 612 communicates with the motor(s) (e.g., a servomotor) used to engage and/or disengage items to be carried during flights. The network interface 616 may be configured to allow data to be exchanged between the UAV control system 630 and other devices attached to a network, such as other computer systems. In various implementations, the network interface 616 may support communication via wireless general data networks, such as a Wi-Fi network. For example, the network interface 616 may support communication via telecommunications networks such as cellular communication networks, satellite networks, and the like.

Input/output devices 618 may, in some implementations, include one or more displays, image capture devices, thermal sensors, infrared sensors, time of flight sensors, accelerometers, pressure sensors, airflow sensors, speed sensors, vibration sensors, noise sensors, weight sensors, temperature sensors, etc. Multiple such input/output devices 618 may be present and controlled by the UAV control system 630. Certain sensors may also be utilized to assist with navigation, landings, avoiding obstacles during flight, etc.

The deflection controller 619 communicates with deflection sensors positioned at each motor of the UAV, receives distance measurements from the deflection sensors and determines if the received distance measurements exceed a threshold or tolerance range for the motor. Alternatively, the deflection controller may be configured to only receive an alert or notification from a deflection sensor if the deflection sensor determines that a distance measurement exceeds a threshold or tolerance range for the motor. In some implementations, the deflection controller 619 may communicate with all deflection sensors of the UAV. In other implementations, each motor and/or each deflection sensor may communicate with a separate deflection controller 619.

The deflection controller also communicates with the motor(s) controller 604 and the navigation system 608 of the UAV control system 630. For example, if an impact between a propeller and an object foreign to the UAV is detected, the deflection controller 619 sends instructions to the motor controller 604 to immediately terminate rotation of the motor that is rotating the propeller for which an impact was detected. In a similar manner, the deflection controller 619 may send instructions to the navigation system that cause the navigation system to alter one or more flight characteristics of the UAV if a rotor deflection that exceeds a threshold is detected, as discussed above.

As shown in FIG. 6, the memory may include program instructions 622 that may be configured to implement the example processes and/or sub-processes described above. The data storage 624 may include various data stores for maintaining data items that may be provided for determining flight plans, landing, etc. In some implementations, data stores may be physically located in one memory or may be distributed among two or more memories.

Those skilled in the art will appreciate that the UAV control system 630 is merely illustrative and is not intended to limit the scope of the present disclosure. In particular, the computing system and devices may include any combination of hardware or software that can perform the indicated functions. The UAV control system 630 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 630. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 630 may be transmitted to the UAV control system 630 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An unmanned aerial vehicle (UAV), comprising:
   a motor arm;
   a motor, including:
      a base coupled to the motor arm:
      a stator affixed to the base and including a plurality of electromagnets; and
      a rotor having an interior surface and an exterior surface that form a cavity and substantially encompass the stator, the rotor includes a plurality of magnets affixed to the interior surface, and the rotor is configured to rotate about the stator when a current is applied to the plurality of electromagnets of the stator;
   a propeller coupled to the rotor and configured to rotate with the rotation of the rotor;
   a deflection sensor configured to measure a distance between the deflection sensor and the rotor and provide the measured distance to a deflection controller, wherein a deflection of the rotor is caused at least in part by an external force applied to at least one of the exterior surface of the rotor, or the propeller; and
   the deflection controller configured to at least:
      determine that the measured distance exceeds an upper threshold or a lower threshold; and
      cause an action to be performed in response to determining that the measured distance exceeds the upper threshold or the lower threshold.

2. The UAV of claim 1, wherein:
   a first magnet of the plurality of magnets affixed to the interior surface of the rotor moves from a first position on the interior surface of the rotor to a second position of the rotor when the deflection exceeds the upper threshold; and
   the motor becomes unstable when the first magnet is in the second position.

3. The UAV of claim 1, wherein the action includes altering a flight characteristic of the UAV such that the external force applied to at least one of the exterior surface of the rotor or the propeller is decreased.

4. The UAV of claim 3, wherein the flight characteristic is at least one of a heading of the UAV, an orientation of the UAV, a velocity of the UAV, an acceleration of the UAV, a speed of the UAV, a rotational speed of the motor, a pitch of the UAV, a yaw of the UAV, a roll of the UAV, a pitch of a blade of the propeller, an angle of the motor with respect to the UAV, or an altitude of the UAV.

5. The UAV of claim 1, wherein the deflection controller is further configured to at least:
   determine that the measured distance corresponds to an impact between the propeller and a foreign object; and
   wherein the action includes terminating a rotation of the motor.

6. The UAV of claim 1, further comprising:
   a second deflection sensor configured to measure a second distance between the second deflection sensor and the rotor and provide the measured second distance to the deflection controller, wherein the second deflection sensor measures the second distance from a second position that is different than a first position of the deflection sensor.

7. A brushless direct current (DC) motor, comprising:
   a base;

a stator affixed to the base and including a plurality of electromagnets;

a rotor having an interior surface and an exterior surface that form a cavity and substantially encompass the stator, the rotor including a plurality of magnets affixed to the interior surface, and the rotor configured to rotate about the stator when a current is applied to the plurality of electromagnets of the stator; and a deflection sensor configured to measure a distance between the deflection sensor and the rotor during an operation of the brushless DC motor and provide the measured distance.

8. The brushless DC motor of claim 7, wherein the deflection sensor is positioned within the base such that the measured distance is representative of a distance between a bottom of the rotor and the base.

9. The brushless DC motor of claim 7, wherein the deflection sensor is positioned within the base such that the measured distance is representative of a distance between a bottom of at least one of the plurality of magnets and the base.

10. The brushless DC motor of claim 7, wherein the deflection sensor is at least one of a capacitive sensor, an inductive sensor, an ultrasonic sensor, a camera, a Hall effect sensor, or a contact sensor.

11. A computer-implemented method, comprising:
under control of one or more computing systems configured with executable instructions,
receiving from a deflection sensor, a first distance measurement representative of a distance between the deflection sensor and a rotor of a motor of an aerial vehicle, wherein the first distance measurement is obtained during an operation of the motor while the aerial vehicle is aerially navigating according to a flight plan;
determining that the distance measurement exceeds a threshold; and
sending instructions that cause the aerial vehicle to alter a flight characteristic.

12. The computer-implemented method of claim 11, further comprising:
determining that the distance measurement corresponds to an impact between a propeller rotated by the motor and a foreign object; and
wherein the flight characteristic that is altered is a rotation of the motor, such that the rotation is stopped.

13. The computer-implemented method of claim 11, further comprising:
receiving from the deflection sensor, a second distance measurement representative of a second distance between the deflection sensor and the rotor of the motor of the aerial vehicle, wherein the second distance measurement is obtained during the operation of the motor while the aerial vehicle is aerially navigating and subsequent to an alteration of the flight characteristic; and
determining that the second distance measurement does not exceed the threshold; and continuing operation of the aerial vehicle according to the flight plan with the altered flight characteristic.

14. The computer-implemented method of claim 11, further comprising:
receiving from the deflection sensor, a second distance measurement representative of a second distance between the deflection sensor and the rotor of the motor of the aerial vehicle, wherein the second distance measurement is obtained during the operation of the motor while the aerial vehicle is aerially navigating and subsequent to an alteration of the flight characteristic; and
determining that the second distance measurement exceeds the threshold; and
sending instructions that cause the aerial vehicle to abort the flight plan.

15. The computer-implemented method of claim 11, wherein the flight characteristic is at least one of a heading of the aerial vehicle, an orientation of the aerial vehicle, a velocity of the aerial vehicle, an acceleration of the aerial vehicle, a speed of the aerial vehicle, a rotational speed of the motor, a pitch of the UAV, a yaw of the UAV, a roll of the UAV, a pitch of a blade of the propeller, an angle of the motor with respect to the UAV, or an altitude of the aerial vehicle.

16. The computer-implemented method of claim 11, further comprising:
receiving from a second deflection sensor, a second distance measurement representative of a second distance between the second deflection sensor and the rotor of the motor of the aerial vehicle, wherein the second distance measurement is obtained during the operation of the motor while the aerial vehicle is aerially navigating according to the flight plan; and
wherein determining that the distance measurement exceeds a threshold includes determining that at least one of the distance measurement or the second distance measurement exceeds a threshold.

17. The computer-implemented method of claim 16, wherein the deflection sensor is at a position of approximately zero degrees with respect to a diameter of the rotor and the second deflection sensor is at a second position of approximately ninety degrees with respect to the diameter of the rotor.

18. The computer-implemented method of claim 11, wherein the threshold is exceeded when the distance between the deflection sensor and the rotor is greater than a defined distance.

19. The computer-implemented method of claim 11, wherein the threshold is exceeded when the distance between the deflection sensor and the rotor is less than a defined distance.

20. The computer-implemented method of claim 11, wherein a deflection of the rotor is caused at least in part by an external force applied to at least one of the rotor or a propeller that is rotated by the motor.

* * * * *